Feb. 19, 1946.   C. G. STRANDLUND   2,395,021
PLOW BOTTOM
Filed April 8, 1943
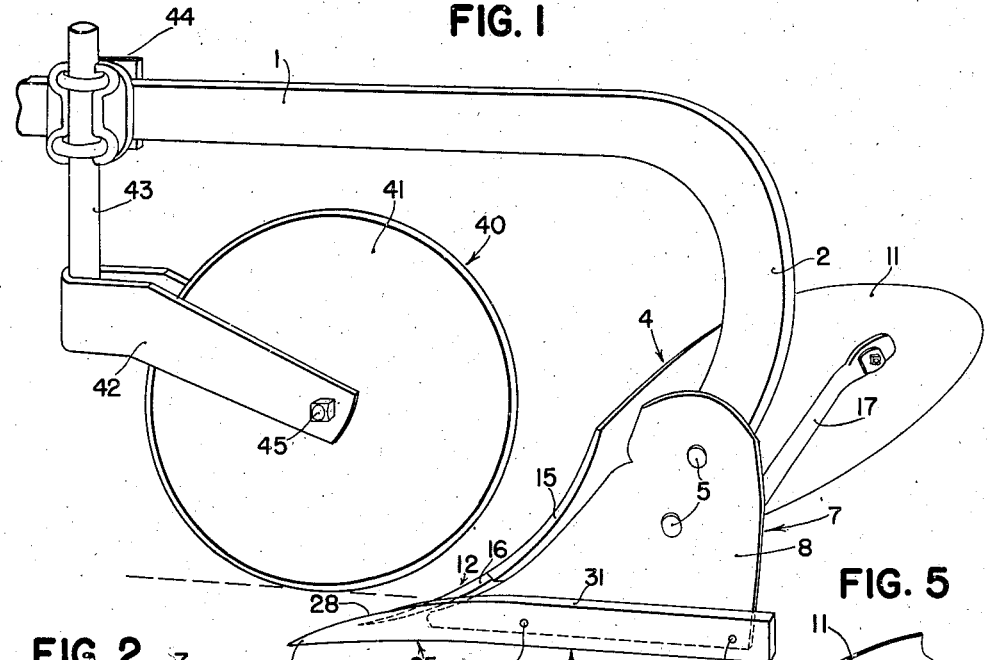
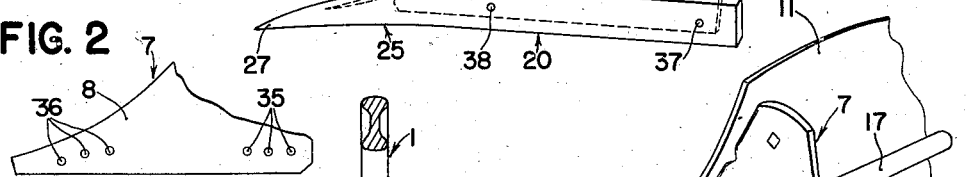
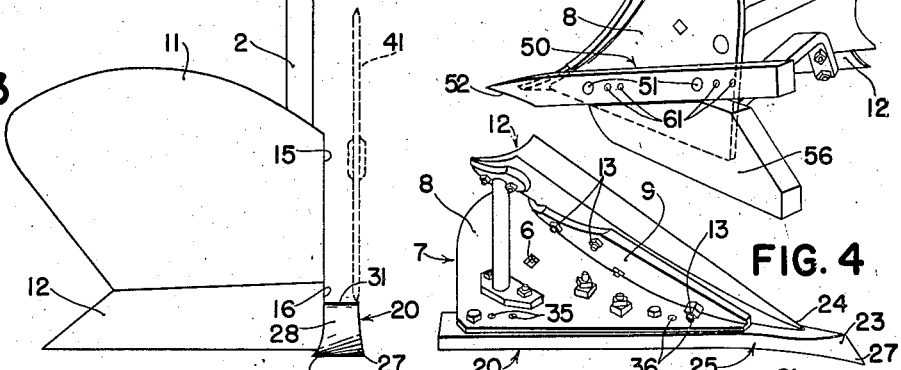
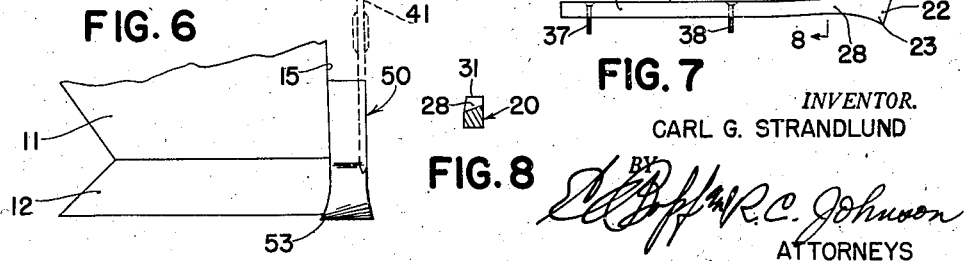
INVENTOR.
CARL G. STRANDLUND
ATTORNEYS Patented Feb. 19, 1946

2,395,021

UNITED STATES PATENT OFFICE 2,395,021

PLOW BOTTOM

Carl G. Strandlund, Moline, Ill., assignor to Deere & Company, Moline, Ill., a corporation of Illinois Application April 8, 1943, Serial No. 482,340

14 Claims. (Cl. 97—113)

The present invention relates generally to agricultural implements and more particularly to moldboard plows.

The object and general nature of the present invention is the provision of a plow bottom in which a single renewable and adjustable member forms both the point and the landside, the forward portion of the combined point and landside being disposed at the landward edge of the share blade which is also removable and replaceable and which consists of a simple inexpensive piece which can be formed by rolling without any expensive forging operations.

More specifically, it is a feature of this invention to provide a plow having a landside bar or point disposed substantially entirely to the landward side of the plane of the frog and the landward edges of the moldboard and share blade. Further, it is a feature of this invention to provide means for adjusting the position of the bar, the adjusting means being so arranged that as the bar is shifted forwardly to compensate for wear at the front or earth-penetrating end, the forward portion is also lowered so as to compensate for wear on the lower face of the front end of the bar.

Another feature of this invention is the provision of a bar point disposed entirely to one side of the plane of the frog and the landward edges of the moldboard and share blade, in connection with a coulter disposed substantially in the landward plane of the bar point, with an open space between the coulter and the edge of the moldboard through which a portion of the furrow slice may be directed substantially directly rearwardly for deposit in the landward corner of the furrow opened by the plow bottom, the landward edge of the moldboard and the coulter forming cutting edges that are spaced apart laterally to provide therebetween the above-mentioned open space. Further, it is a feature of this invention to provide a landwardly disposed bar point in connection with a coulter that is disposed so that its lower edge substantially aligns with the upper edge of the forward portion of the bar, thereby providing for a clean severance of the furrow slice from the land.

A further feature of this invention is the provision of a combined point and landside in which the forward end of the combined point and landside is widened whereby a portion thereof is disposed in front of the forward end of the share blade and protects the latter.

These and other objects and advantages of the present invention will be apparent to those skilled in the art after a consideration of the following detailed description, taken in conjunction with the accompanying drawing, in which:

Figure 1 is a perspective view of a moldboard plow in which the principles of the present invention have been incorporated;

Figure 2 is a fragmentary view of the frog, showing the arrangement of the holes therein to provide for forward adjustment of the combined point and landside member;

Figure 3 is a front view of the plow bottom shown in Figure 1;

Figure 4 is a bottom view, showing particularly the relation between the point member, the frog and the share blade;

Figure 5 is a fragmentary perspective view of a modified form of the present invention in which the landside bar extends generally upwardly and rearwardly;

Figure 6 is a front view of the plow bottom of Figure 5;

Figure 7 is a top view of the combined point and landside bar; and

Figure 8 is a section taken along a line 8—8 of Figure 7.

Referring now to the drawing, the plow in which the principles of the present invention have been incorporated includes a plow beam 1 having a rear downwardly curved end 2 to which a plow bottom or furrow opener, indicated in its entirety by the reference numeral 4, is secured, as by a pair of bolts 5.

The plow bottom 4 is of particular construction. The bolts 5 pass through openings 6 in a frog 7 (see Figure 4), the frog 7 including a landward section 8 and a furrowward section 9. The landward section 8 is disposed in a substantially vertical longitudinally extending plane. The moldboard of the plow bottom is indicated by the reference numeral 11 and is bolted to the landward section 9 of the frog 7. Below the moldboard 11 is a share blade 12 which is bolted, as at 13 (Figure 4), to the section 9 of the frog 7. As best indicated in Figures 1 and 3, the edge 15 of the moldboard 11 and the edge 16 of the share blade 12 are disposed in a common vertical plane that substantially coincides with the plane of the landward section 8 of the frog 7. The moldboard may be reenforced by a brace 17 extending from the frog 7 to the wing of the moldboard.

The combined point and landslide member is indicated in its entirety by the reference numeral 20 and, as best shown in Figures 4 and 7, comprises a bar of substantially rectangular cross section for the major portion of its length, the forward end 21 of the bar being sharpened and widened as at 22, with an extension 23 disposed furrowwardly and lying substantially directly in front of the forwardmost point 24 (Figure 4) of the share blade 12. Also, the bar 20 adjacent its forward end is curved downwardly, as at 25, so as to provide the proper amount of suck to aid in securing the necessary penetration. Also, the landward point 27 (Figure 7) of the forward sharpened end 22 is extended landwardly to aid in penetrating the soil. At the front end of the bar 20 the upper face 28 (Figures 3 and 7) is beveled furrowwardly so as to conform approximately to the angle and inclination of the adjacent portions of the share blade 12.

In the form of the invention shown in Figures 1-4, the bar 20 is bolted to the lower edge of the landside section of the frog 7 so as to lie in substantially horizontal position, with the upper flat face 31 (Figure 1) of the bar 20 appreciably below the moldboard 11. From the construction as described so far it will be clear that the forward end of the bar 20 serves as the point of the plow taking the brunt of the work of penetrating the soil, while the rear portion of the bar 20 runs along the bottom and landward side of the furrow, serving thereby as a landside and heel.

To provide for adjusting the bar 20 forwardly, the landward section 8 of the frog 7 is formed with two sets of openings 35 and 36 (Figure 2). Also, the bar 20 is apertured to receive bolts 37 and 38. The holes 35 in the frog 7 are disposed substantially in a horizontal line while the forward holes 36 are disposed in a downwardly and forwardly extending line that may, if desired, be curved. The purpose of this particular arrangement is this. The front end of the bar 20 is the part that obviously receives the most wear, the wear occurring on both the upper and lower faces thereof. When the cutting edge at the front end of the bar 20 wears back a substantial extent, it is preferable to shift the bar 20 forwardly after sharpening the same so as to bring the renewed point substantially to the same or original position. In order to do this it is usually most convenient to lower the front end of the bar 20 a relatively slight amount, and by disposing the holes 36 in a downwardly curved line, whenever the bar 20 is adjusted to a new forward position the bolt 38, which passes through the opening 36, in being placed in a more forward opening is, at the same time, lowered relative to the frog. The wear on the lower side of the rear portion of the bar 20 is not as great as at the front end, and for that reason the holes 35 may be arranged in a horizontal line. However, if desired, the openings 35 may also be disposed on a downwardly extending line if necessary.

Secured to the plow beam 1 is a coulter 40 of more or less conventional construction, embodying a rotatable disk 41, mounted in a coulter bracket 42 which at its forward portion is connected to the coulter shank 43. The shank is secured to the plow beam 1 by means of a clamping member 44. The coulter disk 41 rotates upon suitable bearings held in place by a bolt 45. As best shown in Figure 3 the plane of the disk 41 is spaced landwardly of the longitudinal vertical plane in which the moldboard and share edges 15 and 16 and the landward face 8 of the frog 7 are disposed. The coulter disk 41 and the edges 15 and 16 define cutting edges at the bottom of which is the point member 20. These cutting edges serve to sever a landward section from the furrow slice, said section passing directly rearwardly over the upper flat face 31 of the bar 20 whence it drops into the landward corner of the furrow while the major and remaining portion of the furrow slice is turned by the moldboard 11 in the usual manner. The advantage of directing a portion from the landward edge of the furrow slice directly rearwardly is that better coverage of trash and the like is secured. The lower edge of the coulter 41 is disposed in longitudinal alignment with the outer or landward edge of the upper face at the front end of the bar 20, as shown by the dotted line in Figure 1.

A modified form of the invention is shown in Figures 5 and 6. In this form of the invention the frog, moldboard and share blade are of substantially the same construction as described above, and hence the same reference numerals have been employed. In this form of the invention a combined point and landside, indicated in its entirety by the reference numeral 50, is fastened to the landward section 8 of the moldboard 7 by attaching bolts 51, the member 50 being disposed in a forwardly and downwardly extending position, as best shown in Figure 5. The bar 50 is of substantially the same form as the bar 20 described above except that the front end is shaped slightly differently, having a bevel 52 on its lower side. As best shown in Figure 6 the furrowward forward point 53 of the bar 50 is disposed substantially directly in front of the forwardmost point of the share blade 12, the point 53 being substantially the same as the point 23 described above. Preferably, the holes (not shown) in the landward section 8 of the frog 7 that receive the bolts 51 are disposed in a straight line, the angle of the bar 50 being chosen so that when the bar 50 is shifted forwardly to compensate for wear, the forward point comes into the desired position without having the front set of holes, such as the holes 36 in Figure 2, arranged in a downwardly extending line. Like the bar 20, the bar 50 is connected with the lower portion of the landward section 8 of the frog 7, but, as shown in Figure 5, since the bar 50 extends upwardly and rearwardly it is desirable to provide a heel plate 56 fastened to the frog 7 just below the bar 50. If desired, the latter may rest on the forward edge of the plate 56, and, taken together, the members 50 and 56 form the landside of the plow bottom. As shown in Figure 6, the coulter 41 is disposed substantially in the plane of the landward face of the bar 50, thus being similar to the arrangement shown in Figure 3 and described above. The coulter 41 forms one cutting edge and the edges 15 and 16 of the moldboard and share form an adjacent cutting edge spaced from the first cutting edge, these cutting edges serving to sever a portion of the furrow slice from the landward side thereof, and the point 50 at the lower portions of these cutting edges serves to direct the severed furrow slice portion directly rearwardly without passing over the moldboard, with the advantages mentioned above in connection with Figures 1-4. If desired, the bar 50 may be provided with a plurality of openings, as indicated at 61 (Figure 5), instead of providing a plurality of openings in the frog 7.

While I have shown and described above the preferred structure in which the principles of the present invention have been incorporated, it is to be understood that my invention is not to be limited to the particular details shown and described above, but that, in fact, widely different means may be employed in the practice of the broader aspects of my invention.

What I claim, therefore, and desire to secure by Letters Patent is:

1. A plow bottom comprising a frog having a planar landward portion, a moldboard and a share blade fixed to said frog and extending generally furrowwardly from the landward portion of said frog, said moldboard and share blade having landside edges disposed substantially in the plane of the landward portion of said frog, and a generally longitudinally extending bar forming a combined point and landside fixed to said landward portion of said frog and disposed substantially entirely landwardly of said plane.

2. A plow bottom as defined in claim 1, further characterized by the forward portion of said combined point and landside being disposed against the landward edge of said share blade and formed with a widened forward end, a portion of which is disposed in front of and serving to protect the forwardmost portion of said share blade.

3. The invention set forth in claim 1, further characterized by said bar having an upper face and a landward face, a coulter disposed in a position spaced landwardly from said plane and substantially in the plane of the landward face of said bar, said coulter having a lower edge disposed in approximate alignment with the upper face of said bar.

4. The invention set forth in claim 1, further characterized by said bar having an upper face and a landward face, a coulter disposed in a position spaced landwardly from said plane and substantially in the plane of the landward face of said bar, said coulter having a lower edge disposed in approximate alignment with the upper face of said bar, said bar being disposed generally horizontally along the lower edge of said frog and adjustable generally forwardly to compensate for wear.

5. The invention set forth in claim 1, further characterized by said bar having an upper face and a landward face, a coulter disposed in a position spaced landwardly from said plane and substantially in the plane of the landward face of said bar, said coulter having a lower edge disposed in approximate alignment with the upper face of said bar, said bar being disposed along the lower portion of said frog in a generally forwardly and downwardly extending direction, said bar being adjustable generally downwardly and forwardly to compensate for wear.

6. A plow bottom having a moldboard, a share blade, a first landside member, and a second landside member disposed in a rearwardly and upwardly extending position substantially over said first landside member and substantially entirely to the landward side of the landward edge of said moldboard and blade, said second member being disposed at its rear end below the upper portion of said moldboard and having a flat upper face adapted to carry a portion of the soil substantially directly rearwardly for deposit into the landward corner of the furrow opened by the plow bottom.

7. An agricultural implement including a plow bottom as set forth in claim 6, further characterized by a coulter disposed substantially in the plane of the landward face of said second member, said coulter serving to sever said portion of the soil from the land.

8. In a plow, the combination of a moldboard and share blade having landward edges, means for supporting said moldboard and share blade with their landward edges disposed in substantially the same vertical plane, a plow point having a landward face and fixed to said supporting means in a position substantially underneath said landward edges and lying substantially landwardly of said vertical plane of said landward edges, and a coulter disposed substantially in front of and above said plow point and disposed substantially in the plane of the landward face of said plow point and spaced landwardly of the vertical plane of the landward edges of said moldboard and share blade.

9. In a plow, a frog member, a generally horizontal fore and aft extending and forwardly adjustable combined point and landside member, one of said members having two sets of transverse openings and the other member carrying transverse bolt means adapted to be inserted into selected openings, the openings of the rear set being substantially horizontally arranged in fore and aft extending line, generally parallel with said combined point and landside member while the openings of the forward set are disposed in a generally forwardly and downwardly extending line, whereby as said combined point and landside member is adjusted forwardly the forward portion of said combined point and landside member is lowered.

10. In an agricultural implement, a furrow opener adapted to sever a furrow slice from the land, said furrow opener having a moldboard and means providing a pair of generally vertically extending laterally spaced cutting edges generally at the landward side of the wallboard with an open space between said edges, whereby a portion of the furrow slice at the landward side thereof is removed from the main body of the furrow slice, and a plow point carried by the furrow opener in a position substantially between the lower portions of said cutting edges whereby said furrow slice portion is directed substantially directly rearwardly without passing over the moldboard.

11. In a plow, a beam, a frog fixed to said beam on the landward side of the latter, a moldboard and share blade having landward edges disposed in substantially the same plane disposed at the landward side of said frog, a plow point disposed against the landward side of said frog and disposed substantially landwardly of said plane, and a coulter disposed substantially in the plane of the landward face of said plow point, there being an open space above said plow point between the landward side of said frog and the plane of said coulter and on the landward side of said beam.

12. In a plow, the combination of a moldboard and share blade having glandward edges, means for supporting said moldboard and share blade with their landward edges disposed in substantially the same vertical plane, a plow point having a landward face and fixed to said supporting means in a position substantially underneath said landward edges and lying substantially landwardly of said vertical plane of said landward edges, and a coulter disposed substantially in front of and above said plow point and disposed substantially in the plane of the landward face of said plow point and spaced landwardly of the vertical plane of the landward edge of said moldboard and share blade.

13. In a plow, a frog member, a generally fore and aft extending and forwardly adjustable combined point and landside member, one of said members having two sets of transverse openings, one set being disposed in front of the other set, and the other member carrying transverse bolt means adapted to be inserted into selected openings, the openings of the rear set being substantially horizontally arranged in a fore and aft extending line generally parallel with said combined point and landside member while the openings of the forward set are disposed in a generally forwardly and downwardly extending line, whereby as said combined point and landside member is adjusted forwardly the forward portion of said combined point and landside member is lowered.

14. In a plow, a support, a generally longitudinally extending bar forming an elongated point and landside member adjustably mounted on said support, and interconnecting means between said support and said member and including a first set of interengageable parts on said support and the forward portion of said member and disposed in a generally forwardly and downwardly extending line for positioning the front end of said member progressively downwardly as the member is shifted forwardly, and a second set of interengaging parts on said support and the rear portion of said member and disposed in a generally horizontally extending line for positioning the rear end of said member progressively horizontally as the point member is shifted forwardly.

CARL G. STRANDLUND.